United States Patent
Qi et al.

(10) Patent No.: US 11,835,669 B2
(45) Date of Patent: Dec. 5, 2023

(54) METHOD AND SYSTEM FOR PET DETECTOR EFFICIENCY NORMALIZATION

(71) Applicant: CANON MEDICAL SYSTEMS CORPORATION, Tochigi (JP)

(72) Inventors: Wenyuan Qi, Vernon Hills, IL (US); Yi Qiang, Vernon Hills, IL (US); Evren Asma, Vernon Hills, IL (US); Xiaoli Li, Vernon Hills, IL (US); Li Yang, Vernon Hills, IL (US); Peng Peng, Vernon Hills, IL (US); Jeffrey Kolthammer, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 74 days.

(21) Appl. No.: 17/557,710

(22) Filed: Dec. 21, 2021

(65) Prior Publication Data

US 2022/0113437 A1    Apr. 14, 2022

Related U.S. Application Data

(63) Continuation of application No. 16/866,993, filed on May 5, 2020, now Pat. No. 11,249,206.
(Continued)

(51) Int. Cl.
   *G01T 1/29* (2006.01)
(52) U.S. Cl.
   CPC .................................. *G01T 1/2985* (2013.01)
(58) Field of Classification Search
   None
   See application file for complete search history.

(56) References Cited

U.S. PATENT DOCUMENTS

| | | | | |
|---|---|---|---|---|
| 5,900,636 A | * | 5/1999 | Nellemann | A61B 6/037 250/363.04 |
| 7,262,415 B2 | * | 8/2007 | Crosetto | A61B 6/037 250/363.04 |

(Continued)

OTHER PUBLICATIONS

André Salomon, et al., "A Self-Normalization Reconstruction Technique for PET Scans Using the Positron Emission Data", IEEE Transactions on Medical Imaging, vol. 31, No. 12, Dec. 2012, pp. 2234-2240
(Continued)

*Primary Examiner* — David P Porta
*Assistant Examiner* — Djura Malevic
(74) *Attorney, Agent, or Firm* — Oblon, McClelland, Maier & Neustadt, L.L.P.

(57) ABSTRACT

A method of normalizing detector elements in an imaging system is described herein. The method includes a line source that is easier to handle for a user, and decouples the normalization of the detector elements into a transaxial domain and an axial domain in order to isolate errors due to positioning of the line source. Additional simulations are performed to augment the real scanner normalization. A simulation of a simulated line source closely matching the real line source can be performed to isolate errors due to physical properties of the crystals and position of the crystals in the system, wherein the simulated detector crystals are otherwise modeled uniformly. A simulation of a simulated cylinder source can be performed to determine errors due to other effects stemming from gaps between the detector crystals.

10 Claims, 13 Drawing Sheets

Related U.S. Application Data

(60) Provisional application No. 62/957,590, filed on Jan. 6, 2020.

(56) References Cited

U.S. PATENT DOCUMENTS

| | | | | |
|---|---|---|---|---|
| 7,569,829 | B2* | 8/2009 | Chen | G01T 7/005 |
| | | | | 250/252.1 |
| 7,718,954 | B2* | 5/2010 | Wang | G01T 1/1648 |
| | | | | 250/252.1 |
| 8,987,659 | B2* | 3/2015 | Laurence | G01T 1/2964 |
| | | | | 250/252.1 |
| 9,483,850 | B2* | 11/2016 | Niu | G06T 7/66 |
| 9,507,033 | B2* | 11/2016 | Rothfuss | G01T 1/1617 |
| 9,614,136 | B2* | 4/2017 | Koike | H01L 33/22 |
| 9,804,275 | B2 | 10/2017 | Niu | |
| 10,126,445 | B2* | 11/2018 | Hashizume | G01T 1/2985 |
| 10,535,165 | B2 | 1/2020 | Liu | |
| 10,754,048 | B2 | 8/2020 | Chang | |
| 11,096,633 | B1* | 8/2021 | Qi | A61B 6/483 |
| 11,568,583 | B2* | 1/2023 | Liu | A61B 6/4275 |
| 2004/0206897 | A1* | 10/2004 | Conti | A61B 6/037 |
| | | | | 250/252.1 |
| 2005/0109943 | A1* | 5/2005 | Vaquero | G01T 1/2008 |
| | | | | 250/363.04 |
| 2005/0129170 | A1* | 6/2005 | Watson | G01T 7/005 |
| | | | | 378/5 |
| 2007/0106154 | A1* | 5/2007 | Conti | G01T 1/1611 |
| | | | | 600/436 |
| 2007/0147589 | A1* | 6/2007 | Thielemans | G06T 11/005 |
| | | | | 378/207 |
| 2007/0176087 | A1* | 8/2007 | Wang | G01T 1/1648 |
| | | | | 250/252.1 |
| 2009/0084947 | A1* | 4/2009 | Yanagita | G01T 1/1648 |
| | | | | 250/252.1 |
| 2014/0316258 | A1* | 10/2014 | Hahn | A61B 6/037 |
| | | | | 600/425 |
| 2015/0048380 | A1* | 2/2015 | Koike | H01L 22/12 |
| | | | | 438/16 |
| 2015/0142389 | A1* | 5/2015 | Niu | G01T 1/1647 |
| | | | | 702/189 |
| 2015/0241576 | A1* | 8/2015 | Rothfuss | G01T 1/2985 |
| | | | | 250/362 |
| 2016/0131774 | A1* | 5/2016 | Lage | A61B 6/5217 |
| | | | | 600/425 |
| 2016/0282486 | A1* | 9/2016 | Balakrishnan | A61B 5/0033 |
| 2017/0345189 | A1* | 11/2017 | Liu | A61B 6/4208 |
| 2018/0196151 | A1* | 7/2018 | Hashizume | G01T 1/17 |
| 2018/0203141 | A1* | 7/2018 | Chang | G06T 11/005 |
| 2020/0170588 | A1* | 6/2020 | Tai | A61B 6/4233 |
| 2022/0113437 | A1* | 4/2022 | Qi | G01T 1/2985 |

OTHER PUBLICATIONS

M. Defrise, et al., "A normalization technique for 3D PET data", Physics in Medicine & Biology, vol. 36, No. 7, 1991, 3 pages (Abstract only)

Paul E. Kinahan, et al., "Efficiency Normalization Techniques for 3D Pet Data", IEEE Nuclear Science Symposium and Medical Imaging Conference Record, Oct. 21-28, 1995, pp. 1021-1025.

Extended European Search Report dated Jun. 9, 2021 in corresponding European Patent Application No. 20217827.3, 8 pages.

Office Action dated Jun. 16. 2023 issued in corresponding Chinese Patent Application No. 202110010607.8 (with Statement of Relevancy).

* cited by examiner

METHOD AND SYSTEM FOR PET DETECTOR EFFICIENCY NORMALIZATION

CROSS REFERENCE TO RELATED APPLICATIONS

This application is a continuation of U.S. application Ser. No. 16/866,993 filed May 5, 2020, which is based upon and claims the benefit of priority from U.S. Provisional Application No. 62/957,590, filed on Jan. 6, 2020, the entire contents of each of which are incorporated herein by reference.

FIELD OF THE INVENTION

This disclosure relates to a method and system for providing improved positron emission tomography (PET) detector normalization using a small to line-sized cylindrical source augmented with a normalization simulation of a small to line-sized cylindrical source.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Positron emission tomography (PET) is a functional imaging modality that is capable of imaging biochemical processes in humans or animals through the use of radioactive tracers. In PET imaging, a tracer agent is introduced into the patient to be imaged via injection, inhalation, or ingestion. After administration, the physical and bio-molecular properties of the agent cause it to concentrate at specific locations in the patient's body. The actual spatial distribution of the agent, the intensity of the region of accumulation of the agent, and the kinetics of the process from administration to its eventual elimination are all factors that may have clinical significance.

PET systems can employ several corrections to ensure accurate and reliable image reconstruction. One of the most common and important corrections is attenuation correction. The ability to accurately correct for attenuation in PET was one of the first developments that considerably improved final reconstructed images, especially as compared with single photon emission computed tomography (SPECT). In addition to attenuation, common correction schemes with other modalities (e.g. scatter correction, dead-time estimation), and other PET-specific corrections (e.g. randoms correction), are also used for improved qualitative and quantitative results.

The inherent properties of PET detector architecture and the crystals themselves are sources of different types of systematic and random errors that should be accounted for. Lines of response (LORs) in a PET dataset have differing sensitivity for a variety of reasons including variations in detector efficiency, solid angle subtended, and summation of neighboring data elements. Information on these variations is utilized to yield more accurate reconstruction of quantitative and artefact-free images. Notably, these variations can be corrected for before or during image reconstruction. Normalization refers to the process of correcting for said variations and normalization coefficients refer to the correction factors for each LOR. A poorly normalized PET detector can deteriorate the diagnostic value of the images produced.

The Defrise method includes the use of a large uniform cylindrical phantom or rotating cylindrical phantom that can be heavy and difficult to prepare since i) the Defrise method is based on the assumption that the LORs passing through the center of a cylindrical phantom and the neighboring LORs have the same counts; ii) a large cylindrical phantom can have events with oblique incident angles of crystals in a transaxial domain; and iii) a cylindrical phantom is closer to the size of a real patient. Such a cylindrical phantom can be increasingly difficult to handle for PET scanners with longer axial field of views (FOVs) or a large bore. Thus, a phantom with a small radius and low weight for use in any PET scanning system is desired.

SUMMARY

The present disclosure relates to an imaging system, including: processing circuitry configured to obtain a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, determine, for each real detector in one ring of the rings of the real detectors, a relative transaxial efficiency based on the real singles count for the each real detector in the one ring of the rings of the real detectors, pair the single gamma rays emitted from the real line source traveling in opposite directions to obtain pairs of the single gamma rays, obtain a real pairs count of the pairs of the single gamma rays emitted from the real line source and detected by i) a first real detector of the real detectors along a first line of the real detectors disposed at the same position in each ring of the rings of the real detectors, and ii) all real detectors along a second line of the real detectors, the second line of real detectors disposed at the position opposite the first real detector in the ring, wherein the first real detector of the real detectors along the first line detects a first of the single gamma rays in the detected pair, and one of real detectors in the second line of the real detectors detects a second of the single gamma rays in the detected pair, determine, for each real detector in the first line of the real detectors, a relative axial efficiency based on the real pairs count, and determine, for each real detector of the real detectors, a real line source detector efficiency based on the relative axial efficiency and the relative transaxial efficiency.

The disclosure additionally relates to a method of normalizing detector elements in a scanning system, including: obtaining a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, determining, for each real detector in one ring of the rings of the real detectors, a relative transaxial efficiency based on the real singles count for the each real detector in the one ring of the rings of the real detectors, pairing the single gamma rays emitted from the real line source traveling in opposite directions to obtain pairs of the single gamma rays, obtaining a real pairs count of the pairs of the single gamma rays emitted from the real line source and detected by i) a first real detector of the real detectors along a first line of the real detectors disposed at the same position in each ring of the rings of the real detectors, and ii) all real detectors along a second line of the real detectors, the second line of real detectors disposed at the position opposite the first real detector in the ring, wherein the first real detector of the real detectors along the first line detects a first of the single gamma rays in the detected pair, and one of real detectors in the second line of the real detectors detects a second of the single gamma rays in the detected pair, determining, for each real detector in the first line of the real detectors, a relative axial efficiency based on the real pairs count, and determining, for each real detector of the real detectors, a real line source detector efficiency based on the relative axial efficiency and the relative transaxial efficiency.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
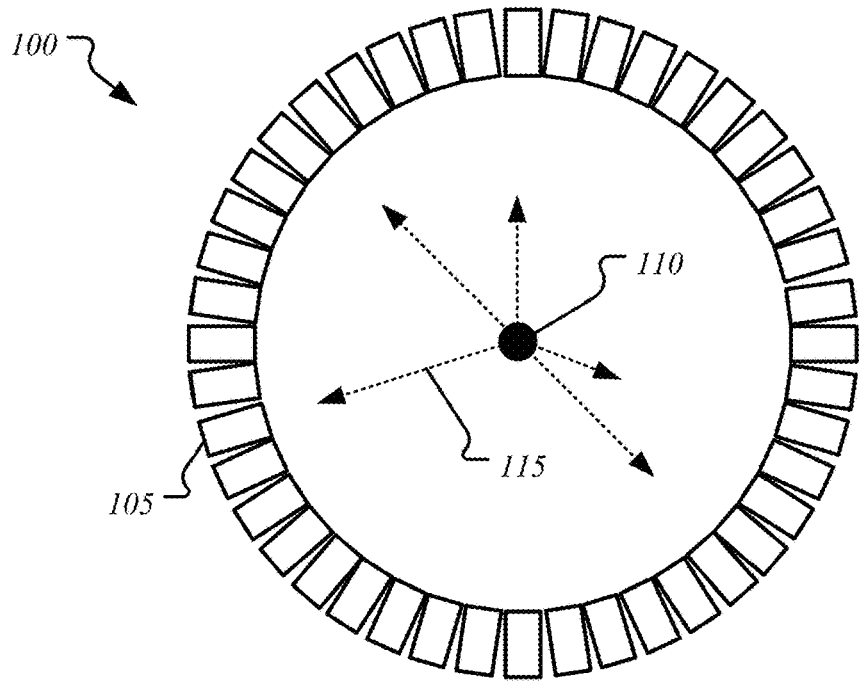
FIG. 1A shows a transaxial cross-sectional schematic of a PET scanner, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

According to one embodiment discussed herein, a method for crystal efficiency normalization includes i) determining a singles events count for each of a plurality of detector crystals in a positron emission tomography (PET) scanner system along a transaxial domain within a ring of the plurality of detector crystals, and ii) determining a pairs events count for pairs of the plurality of detector crystals along an axial domain of the plurality of the detector crystals for an adjustable radius cylindrical phantom.

According to one embodiment discussed herein, a method for crystal efficiency normalization includes a cylindrical phantom with an adjustable radius. Notably, moving parts can be minimized, and preparation, handling, and storage of the cylindrical phantom are improved. While some normalization methods utilize cylindrical phantoms having a 20 cm radius to best match the radius of the average patient torso, the disclosed method's adjustable radius cylindrical phantom can be better tailored to and optimized for each patient. Notably, the cylindrical phantom can be narrow and approach a line source having ideal point source radiation emission.

For PET scanner efficiency normalization, each detector crystal in the detector array may have variance from one another. This may be due to manufacturing defects, varied manufacturing protocols, or minor material property (e.g. crystal structure) variation even among crystals fabricated in a same protocol from a single manufacturer. Additionally, when the crystals are installed in the PET system, electronics connected to the crystals can include performance variations as well. Lastly, the geometric arrangement of the crystals can introduce further differences in efficiency, which can include a position of the crystals as well as gaps between the crystals. The overall performance of the detector crystal due to all the aforementioned sources of performance degradation can be expressed as a detector crystal efficiency. That is, a first detector crystal in the system can detect fewer signals or events as another second crystal in the same system. This detection of fewer signals can lead to, for example, an incorrect conclusion of additional attenuation of the radiation (i.e. mistakenly concluding the body has absorbed the radiation). From this, additional attenuation can be included in the eventual image reconstruction. Reconstruction of images from data without accounting for the detector crystal efficiencies can lead to improper diagnoses. Thus, crystal normalization is utilized to determine relative differences between all the detector crystals in order to improve image reconstruction accuracy. Notably, relative detector crystal efficiency instead of absolute detector crystal efficiency can be sufficient in improving image reconstruction.

FIG. 1A shows a transaxial cross-sectional schematic of a PET scanner 100, according to an embodiment of the present disclosure. In an embodiment, the PET scanner 100 includes detector crystals 105 arranged in a ring around a central axis that are configured to detect gamma rays. The PET scanner 100 can include additional rings of detector crystals 105 disposed along the axis of the rings. Additional PET scanner 100 features are shown in FIGS. 8A and 8B and described in the accompanying description below. An object to be scanned can be arranged in the center of the detector crystals 105, such as a phantom or a human. For example, the phantom can be a real line source (RLS) 110. It may be understood that the term "real" hereinafter in "the RLS 110," "the real detectors," "the real singles count," "the real pairs count," and the like, can refer to non-simulated features. For example, the RLS 110 can be a physical, tangible phantom or radiation source that a user in a commercial setting can handle and physically place in the PET scanner 100. Similarly, terms and features with the modifier "simulated" hereinafter can refer to terms and features that are simulated or modeled using any simulation or mathematical modeling method, for example, a Monte Carlo simulation.

In an embodiment, the RLS 110 can be solid or hollow and configured to emit radiation, for example via filling a hollow cavity with a fluid having a tracer, wherein the tracer emits positrons. Notably, the RLS 110 can be lighter in weight and smaller in radius than other phantoms used, for example wider bore cylinder phantoms. The RLS 110 can additionally be advantageous compared to narrower cylinder phantoms that are arranged in PET scanners and require accurate rotation by complex machinery, sometimes referred to as rotating tube phantoms.

When an emitted positron from the phantom or human collides with an electron, an annihilation event occurs, wherein the positron and electron are combined. Most of the time, the annihilation event produces two gamma rays (at 511 keV) traveling at substantially 180 degrees apart. One of these gamma rays can be referred to as a single 115. To reconstruct the spatio-temporal distribution of the tracer via tomographic reconstruction principles, each detected event is characterized for its energy (i.e., amount of light generated), its location, and its timing. By detecting the two gamma rays (i.e. two of the singles 115), and drawing a line between their locations, i.e., the line-of-response (LOR), one can determine the likely location of the original disintegration.

Figure 1B:
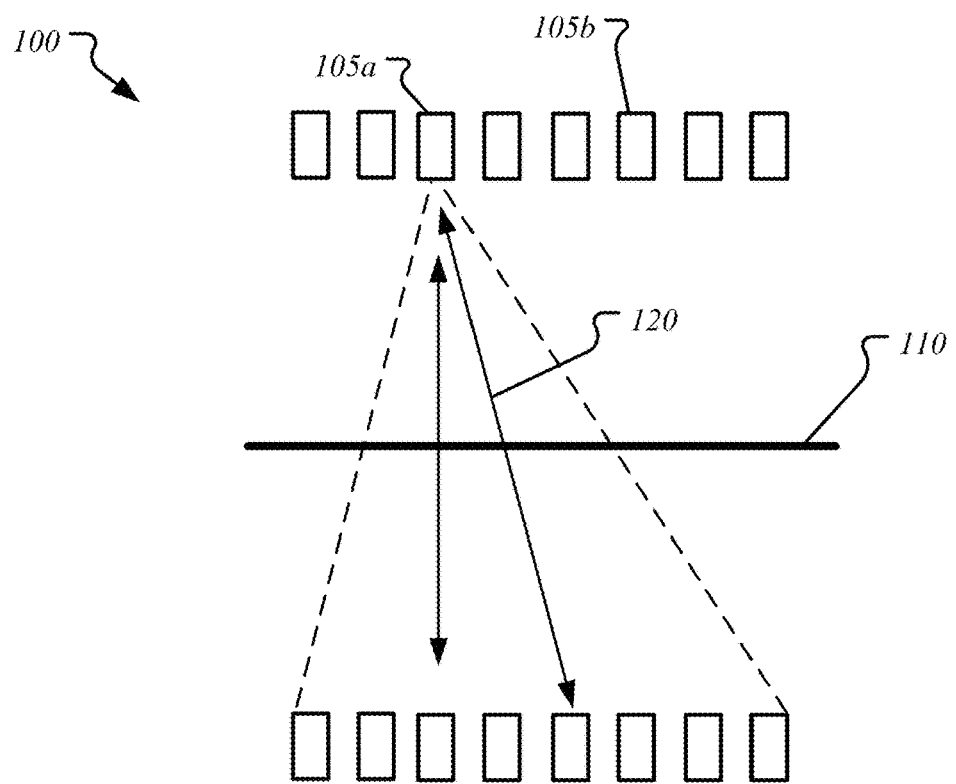
FIG. 1B shows efficiency normalization in an axial domain for a first crystal, according to an embodiment of the present disclosure.
Figure 1C:
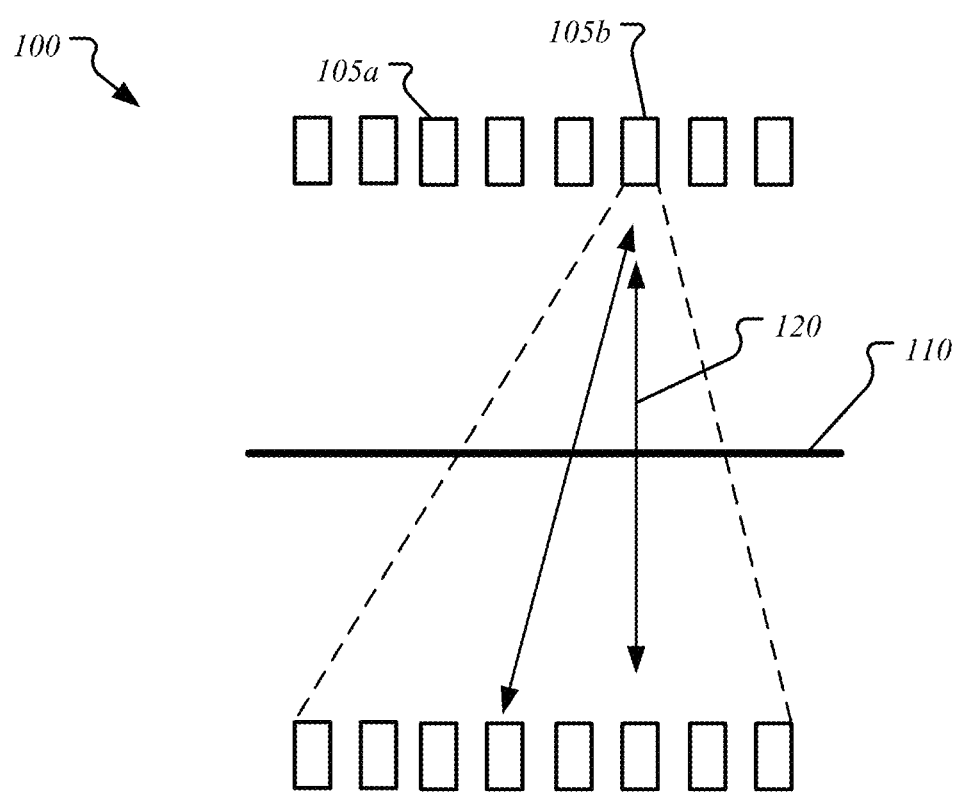
FIG. 1C shows efficiency normalization in the axial domain for a second crystal 105b, according to an embodiment of the present disclosure.

FIGS. 1B and 1C show axial cross-sectional schematics of the PET scanner 100, according to an embodiment of the present disclosure. The cross-section can be along the axis of the PET scanner 100 such that one of the positions of the crystals 105 in the ring arrangement is shown for the length of the PET scanner 100 having multiple rings. Similarly, the length of the RLS 110 disposed in the center of the PET scanner 100 is also depicted. The RLS 110 can emit radiation as described above for FIG. 1A, but in FIGS. 1B and 1C, the singles 115 have been paired into the two singles 115 traveling at substantially 180 degrees apart from the annihilation event, which can be referred to as a pair 120.

In an embodiment, to perform efficiency normalization of the crystals 105, FIG. 1A shows how the emitted singles 115 from the centered RLS 110 can be counted for each crystal 105 in the same ring and the count of the singles 115 can subsequently be compared. That is, the real (non-simulated) RLS 110 can be arranged in the real (non-simulated) PET scanner 100 and the efficiency of the real crystals 105 can be decoupled into a transaxial domain (orthogonal to the axis of the PET scanner 100 along a plane of a single ring) and an axial domain (along the axis of the PET scanner 100). However, in the transaxial domain, the singles 115 count for each crystal 105 can be location-dependent due to positioning errors when arranging the RLS 110 in the PET scanner 100. That is, if the position of the RLS 110 is slightly closer to one side of the ring of the detectors 105, the detectors 105 along the one side will detect more counts of the singles 115. Thus, there can be ambiguity as to whether the efficiency differences between the crystals 105 are caused by the crystal 105 properties (e.g. material (crystal structure) defects, manufacturing defects, etc.) or the location of the crystals 105. Thus, an additional efficiency normalization step using the RLS 110 can be performed to remedy the ambiguity.

FIG. 1B shows efficiency normalization in the axial domain for a first crystal 105a, according to an embodiment of the present disclosure. FIG. 1C shows efficiency normalization in the axial domain for a second crystal 105b, according to an embodiment of the present disclosure. In an embodiment, the first crystal 105a and the second crystal 105b can be in the same position along the ring in the PET scanner 100, but in different rings. The relative efficiencies between the first crystal 105a and the second crystal 105b can be determined by i) pairing the singles 115 into the acceptable pairs 120 that are detected by the first crystal 105a or the second crystal 105b and the coupled crystals on the opposite side (to remove the unbalanced detection of the singles 115 by the crystals 105 in the rings in the middle of the PET scanner 100 compared to the crystals 105 in the rings along the edge of the PET scanner 100), ii) counting the pairs 120 detected at the first crystal 105a and all the crystals 105 along an opposite side coupled with the first crystal 105a, and iii) counting the pairs 120 detected at the second crystal 105b and all the crystals 105 along the opposite side coupled with the second crystal 105b. Since the same crystals 105 on the opposite side are used to couple with the first crystal 105a and the second crystal 105b, if there is any count difference in the pairs 120 between these groups, it is caused by the efficiency differences of the first crystal 105a and the second crystal 105b. This can be performed for all the crystals 105 at each position in the ring to determine the relative efficiencies of each crystal 105 in the PET scanner 100 along the axial domain.

Subsequently, the axial and transaxial efficiencies can both be considered in combination to determine the overall efficiency for each crystal 105. In an embodiment, there can be I rings and J crystals 105 for each ring. The detected singles 115 count for each crystal 105 can be given as:

$$s_{i,j}, i=1, \ldots, I, j=1, \ldots, J$$

and the relative efficiency of the crystals 105 in the transaxial domain can be given as:

$$\frac{s_{i,j}}{\sum_{j=1}^{J} s_{i,j}}$$

The detected pairs 120 count for each crystal 105 can be given as:

$$p_{i,j}, i=1, \ldots, I, j=1, \ldots, J$$

and the relative efficiency of the crystals 105 in the axial domain can be given as:

$$\sum_{j=1}^{J} p_{i,j}$$

Thus, the estimated efficiency for each crystal 105, $\eta_{i,j}$, can then be given as:

$$\eta_{i,j} = \frac{1}{N} \frac{s_{i,j}}{\sum_{j=1}^{J} s_{i,j}} \sum_{j=1}^{J} p_{i,j}$$

where N is the normalization factor for $\eta_{i,j}$.

Figure 2:
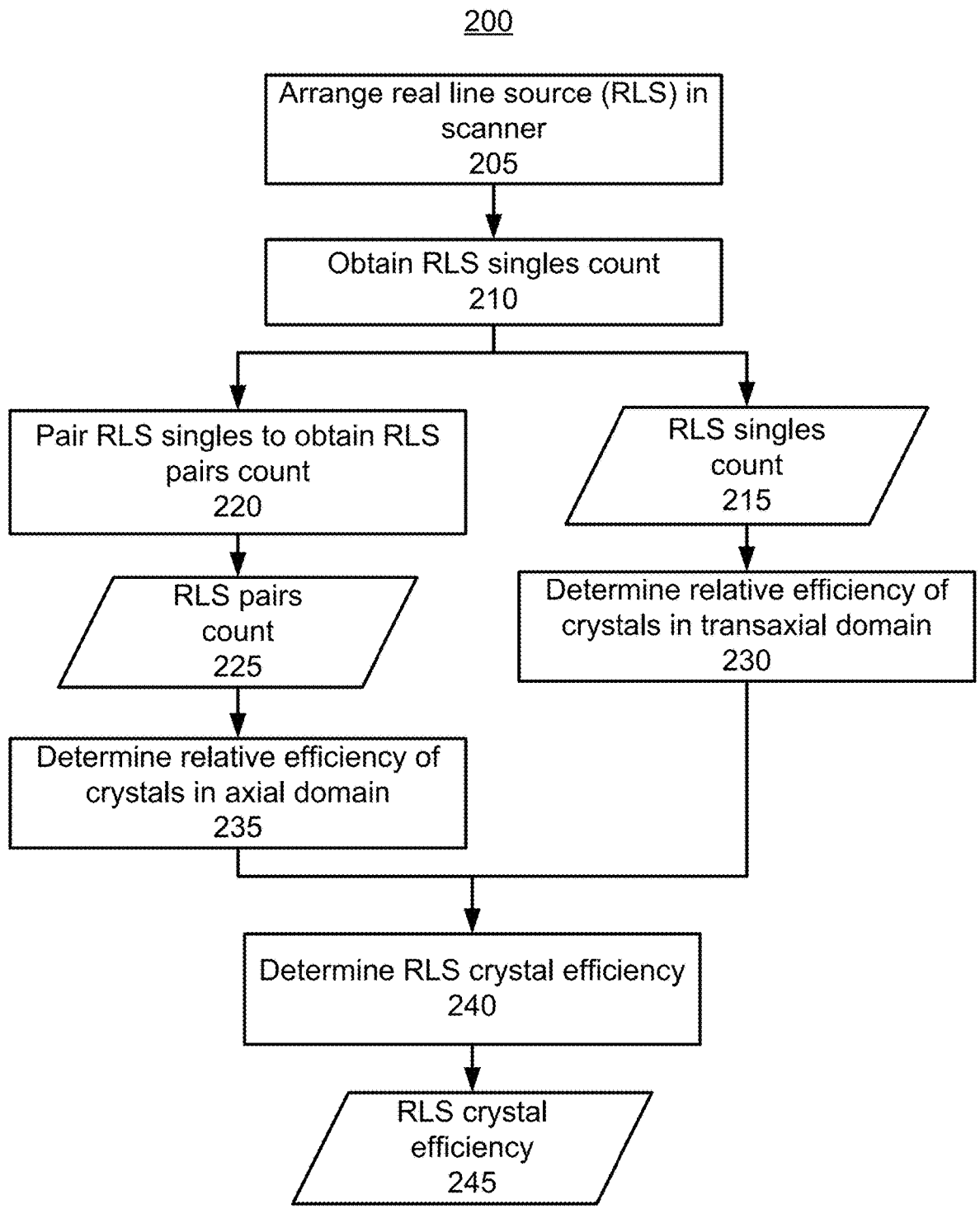
FIG. 2 shows a non-limiting example of a flow chart for a method of determining crystal efficiency with a real line source (RLS), according to an embodiment of the present disclosure.

FIG. 2 shows a non-limiting example of a flow chart for a method 200 of determining crystal 105 efficiency with the RLS 110, according to an embodiment of the present disclosure. In step 205, the RLS 110 is arranged in the PET scanner 100. In step 210, the singles 115 emitted from the RLS 110 can be counted for the crystals 105 in the transaxial domain. That is, for the crystals 105 in each ring, and each ring of the detectors 105 is counted separately from other rings. The singles 115 can be counted to obtain a RLS singles count 215 ($s_{i,j}$). For the axial domain, the singles 115 can be paired together and counted in step 220 to obtain a RLS pairs count 225 ($p_{i,j}$). In step 230, the relative efficiency of the crystals 105 in the transaxial domain can be determined based on the RLS singles count 215

$$\left(\frac{s_{i,j}}{\sum_{j=1}^{J} s_{i,j}}\right).$$

In step 235, the relative efficiency of the crystals 105 in the axial domain can be determined based on the RLS pairs count 225 ($\sum_{j=1}^{J} p_{i,j}$). In step 240, the overall RLS 110 crystal 105 efficiency can be determined based on the RLS singles count 215 and the RLS pairs count 225 to obtain a RLS crystal efficiency 245. Advantageously, the entire method 200 can be performed with a single normalization scan, and does not require scans of additional phantoms.

Notably, the crystals 105 shown in FIG. 1A are depicted as being in contact with neighboring crystals 105, but the PET scanner 100 in a real setting may have the crystals 105 arranged in groups or modules that can include gaps between the crystals 105. The efficiency determined from the RLS 110 can provide more ideal LORs (i.e. pairs 120) that originate from a more centered and more point-source-like origin, but this can negate some effects derived from annihilation event origins that are off-center. The off-center LORs can then travel into the gaps between the crystals 105 and additionally contribute to detected counts of the singles 115 or pairs 120 at a side of the crystal 105 having no "shade" from the neighboring crystal 105 due to the gap. Regardless, the count is registered by the crystal 105 and this can lead to errors in determining the origin of the detected single 115 or pair 120.

Therefore, in view of the above, simulated efficiency can be determined via a simulation of a cylinder source in the PET scanner 100. The simulation can provide insight into the relative efficiency differences caused by the crystal 105 arrangement, gaps between the crystals 105, and a shape of the crystals 105. These factors can be determined by simulation in order to augment the relative efficiency differences caused by variations due to electronic components, manufacturing defects, etc. that can be determined via the RLS 110 and method 200. Advantageously, simulations can provide a relatively fast, accurate, autonomous, and low-effort (from the user) method to further refine the relative efficiency differences of the PET scanner 100.

Figure 3:
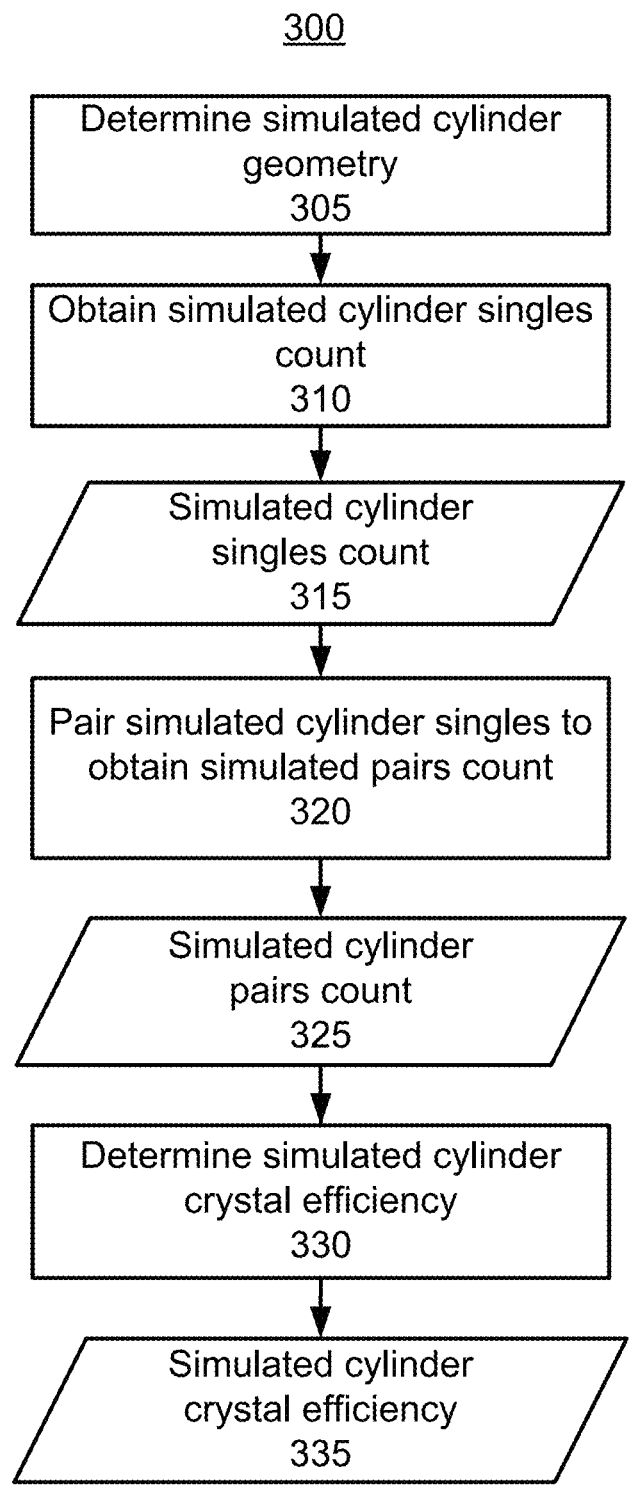
FIG. 3 shows a non-limiting example of a flow chart for a method of determining simulated crystal efficiency with a simulated cylinder source, according to an embodiment of the present disclosure.

FIG. 3 shows a non-limiting example of a flow chart for a method 300 of determining simulated crystal 105 efficiency with the simulated cylinder source, according to an embodiment of the present disclosure. In step 305, a geometry of the simulated cylinder can be determined and arranged in a simulated PET scanner. In step 310, simulated singles emitted from the simulated cylinder can be counted for simulated crystals in the transaxial domain to obtain a simulated cylinder singles count 315. For the axial domain, the simulated singles can be paired together and counted in step 320 to obtain a simulated cylinder pairs count 325. In step 330, an efficiency of the simulated cylinder can be determined based on the simulated cylinder singles count 315 and the simulated cylinder pairs count 325 to obtain a simulated cylinder crystal efficiency 335.

As previously described, the crystal 105 efficiency is affected by the geometry errors (the arrangement of the crystals 105, the gaps between the crystals 105.) and the physical property errors (manufacturing defects, etc.). To determine the relative difference in crystal efficiency caused by only the physical property errors of the crystals 105 in the PET scanner 100 itself, a simulated line source can be arranged in the simulated PET scanner.

Figure 4:
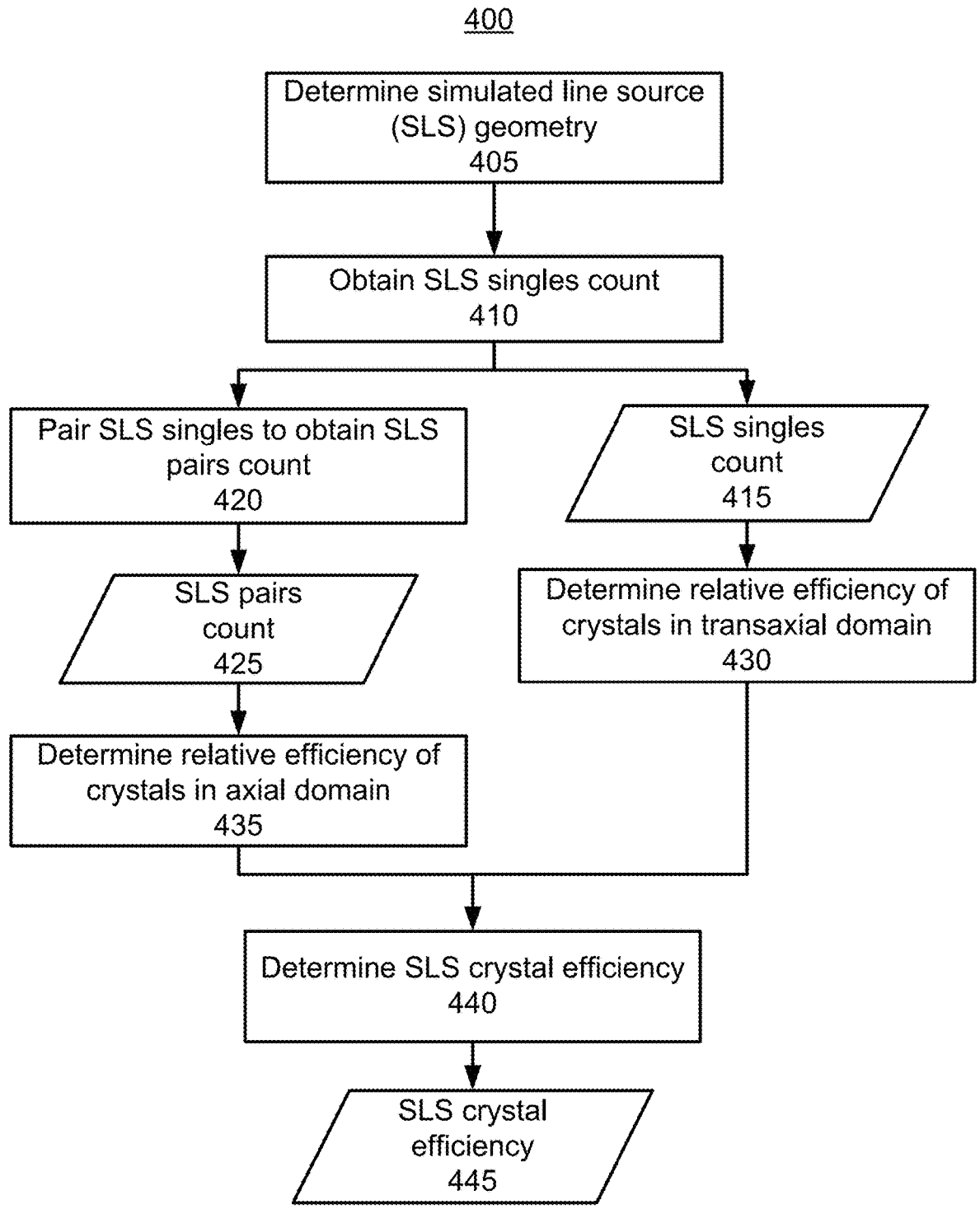
FIG. 4 shows a non-limiting example of a flow chart for a method of determining simulated crystal efficiency with a simulated line source, according to an embodiment of the present disclosure.

FIG. 4 shows a non-limiting example of a flow chart for a method 400 of determining simulated crystal 105 efficiency with the simulated line source, according to an embodiment of the present disclosure. In step 405, a geometry of the simulated line source can be determined and arranged in the simulated PET scanner. In step 210, the simulated singles emitted from the simulated line source can be counted for the simulated crystals in the transaxial domain. The simulated singles can be counted to obtain a simulated line source singles count 415. For the axial domain, the simulated singles can be paired together and counted in step 420 to obtain a simulated line source pairs count 425. In step 430, the relative efficiency of the simulated crystals in the transaxial domain can be determined based on the simulated line source singles count 415. In step 435, the relative efficiency of the simulated crystals in the axial domain can be determined based on the simulated line source pairs count 425. In step 440, the overall simulated line source crystal efficiency can be determined based on the simulated line source singles count 415 and the simulated line source pairs count 425 to obtain a simulated line source crystal efficiency 445. Calculations of the relative efficiencies of the simulated crystals in the transaxial and axial domain 415, 425 and the simulated line source crystal efficiency 445 can be calculated similarly to the calculations for the method 200.

Notably, the method 400 can be performed in combination with the method 200, wherein the geometry, arrangement, and emission properties of the PSL 110 of the method 200 can closely match the geometry, arrangement, and emission properties input by the user for the simulated line source of the method 400, and vice versa. Other scan variables, such as the acquisition duration, can be matched in the simulation according to the desired scan conditions for the real PET scanner 100. Subsequently, a comparison can be made between the RLS singles count 215 and the simulated line source singles count 415. Since the simulation and the real PET scanner 100 can be tuned to operate under the same conditions, if there is a discrepancy between the determined efficiency values, the discrepancy will likely be caused by the physical property errors of the crystals 105 in the real PET scanner 100. That is, the simulation will model substantially identical crystals having substantially identical properties and dimensions and highlight errors stemming from electronics effects, manufacturing defects, etc.

Figure 5:
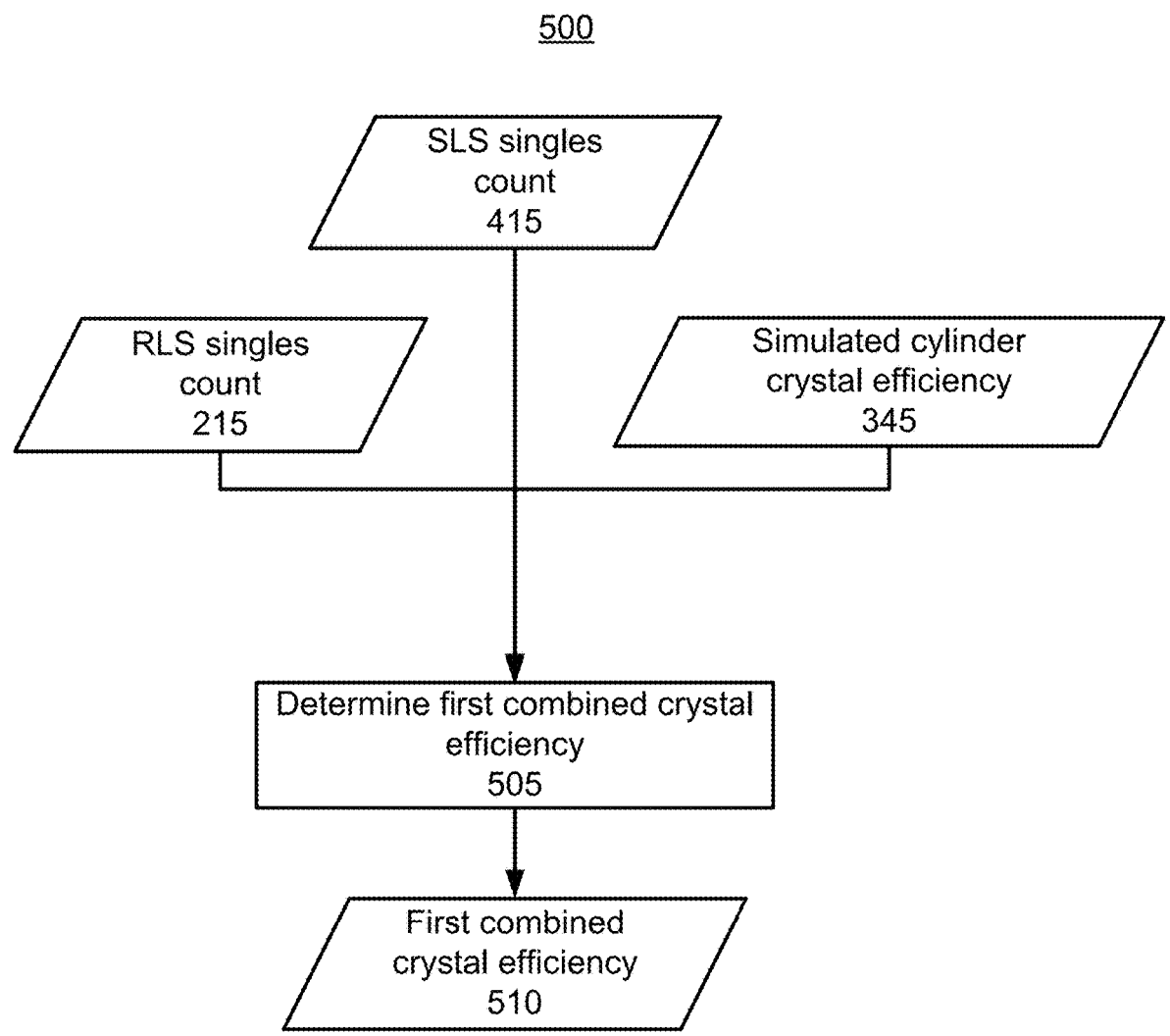
FIG. 5 shows a non-limiting example of a flow chart for a method of determining a first combined crystal efficiency, according to an embodiment of the present disclosure.

FIG. 5 shows a non-limiting example of a flow chart for a method 500 of determining a first combined crystal efficiency 510, according to an embodiment of the present disclosure. In an embodiment, the comparison of the RLS singles count 215 and the simulated line source singles count 415 cannot fully account for the geometry errors from a non-point-source emitter, so the comparison can be combined with the simulated cylinder crystal efficiency 335. The simulation of the cylinder source can be used to determine the geometry errors on the crystal 105 efficiency. The RLS singles count 215 can be given as $s_{i,j}^{Line\_real}$, the simulated line source singles count 415 can be given as $s_{i,j}^{Line\_Sim}$, and the simulated cylinder crystal efficiency 335 can be given as $\eta_{i,j}^{Cylinder\_Sim}$. In step 505, by combining the differences between the simulated line source and the RLS 110 (to capture the physical property effects) with the differences due to geometry errors via the simulated cylinder source, the first combined crystal efficiency 510 can be determined. The first combined crystal efficiency 510 can be given as $\eta_{i,j}^{First\_Combined}$ and determined by the relation:

$$\eta_{i,j}^{First\_Combined} = \frac{1}{N} s_{i,j}^{Line\_real} \frac{\eta_{i,j}^{Cylinder\_Sim}}{s_{i,j}^{Line\_Sim}}.$$

Figure 6:
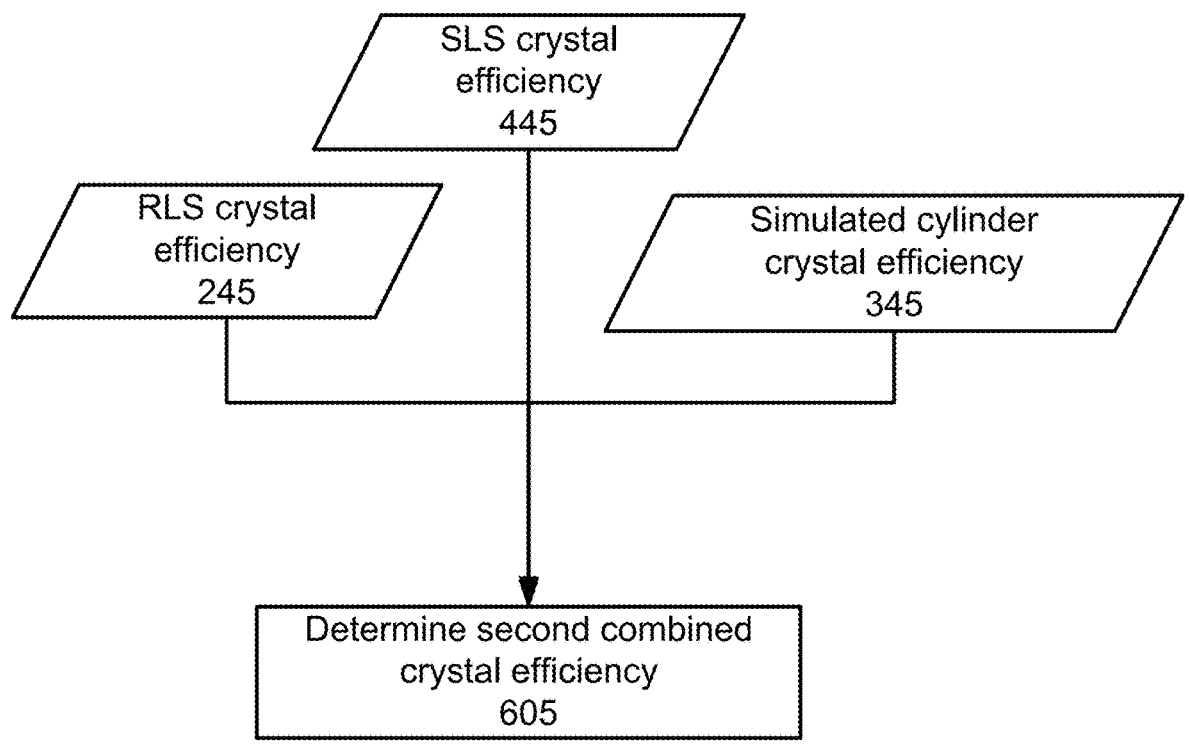
FIG. 6 shows a non-limiting example of a flow chart for a method of determining a second combined crystal efficiency, according to an embodiment of the present disclosure.

FIG. 6 shows a non-limiting example of a flow chart for a method 600 of determining a second combined crystal efficiency 610, according to an embodiment of the present disclosure. It may be difficult for a user to arrange the RLS 110 in the exact same position and orientation as the simulated line source. Any of the incorrect positioning can cause a non-uniform distribution or distribution change of the detected LORs. If the incorrect positioning of the RLS 110 causes this kind of change, ambiguity is introduced as to whether errors are caused by real physical property errors or positioning errors. As previously described, the RLS 110 can capture most of the crystal 105 efficiency except for the errors due to the transaxial domain gaps between the crystals 105. That is, most of the physical property and geometry errors can be accounted for, but not the transaxial domain gaps. Thus, the simulated cylinder source is introduced because it can account for the transaxial domain gaps between the crystals 105. Then, the physical property error effects can be narrowed down by comparing the results of the simulated line source in the simulation and the real PSL 110 in the real scan. The difference in the singles count can be caused by positioning of the line source, but the crystal efficiency, which was narrowed down by the difference in the pairs count, will not be affected by the positioning of the line source. The simulation of the cylinder source can be used to determine the geometry errors on the crystal 105 efficiency. The RLS crystal efficiency 245 can be given as $\eta_{i,j}^{Line\_Real}$, the simulated line source crystal efficiency 445 can be given as $\eta_{i,j}^{Line\_Sim}$, and the simulated cylinder crystal efficiency 345 can be given as $\eta_{i,j}^{Cylinder\_Sim}$. Thus, in step 605, a comparison between the RLS crystal efficiency 245 from the real scan, the simulated line source crystal efficiency 445 from the simulated line source scan, and the simulated cylinder crystal efficiency 345 from the simulated cylinder scan can result in the robust and comprehensive second combined crystal efficiency 610. The second combined crystal efficiency 610 can be given as $\eta_{i,j}^{Secone\_Combined}$ and determined by the relation:

$$\eta_{i,j}^{Second\_Combined} = \frac{1}{N} s_{i,j}^{Line\_Real} \frac{\eta_{i,j}^{Cylinder\_Sim}}{s_{i,j}^{Line\_Sim}}.$$

After the efficiency differences of the crystals 105 have been determined via any of the aforementioned methods, the normalized values can be utilized to more accurately reconstruct subsequent images.

Figure 7:
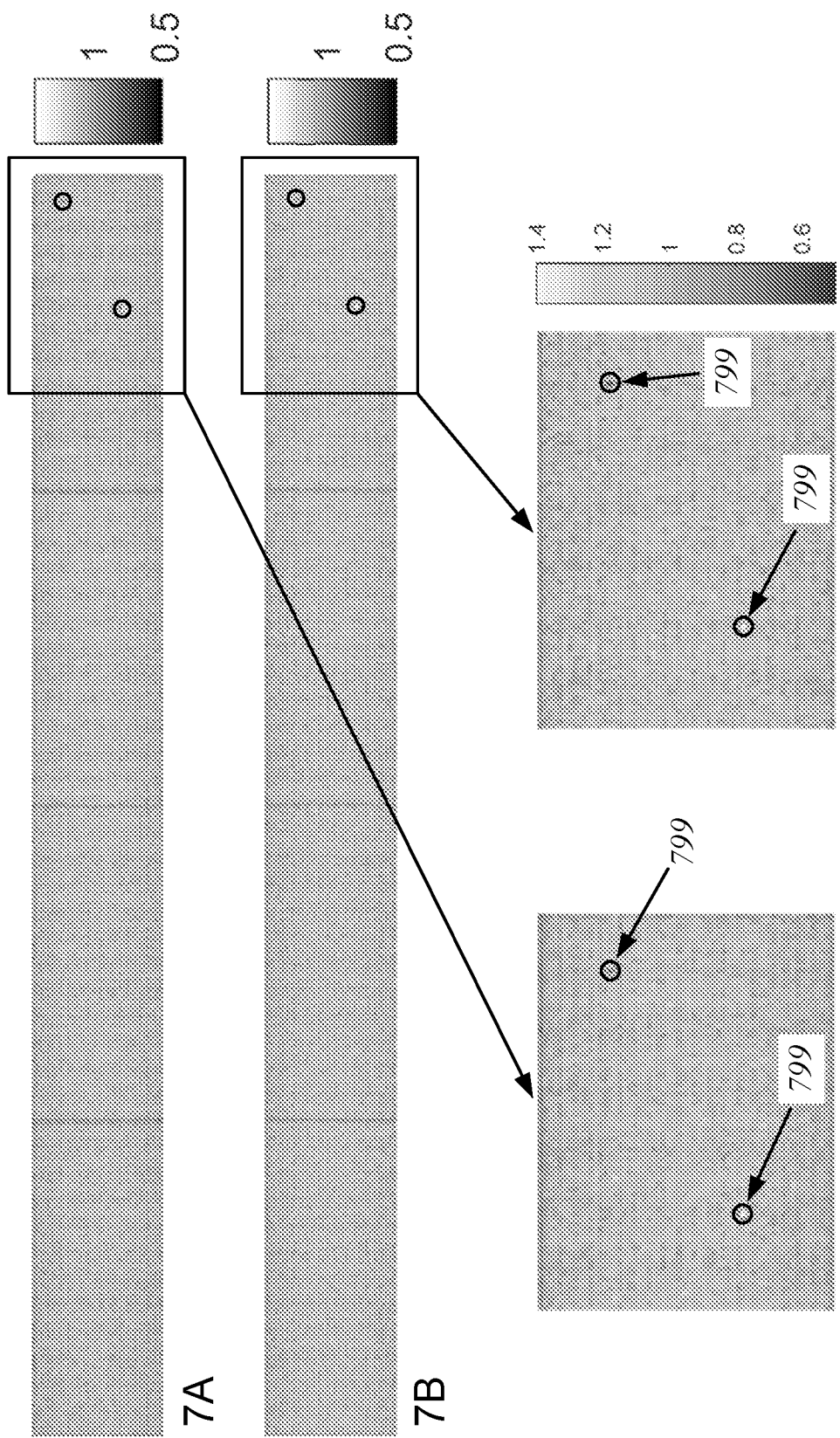
FIG. 7A shows a crystal efficiency map from a cylinder source generated using the Defrise method, according to an embodiment of the present disclosure.
FIG. 7B shows a crystal efficiency map from a line source generated using method described herein, according to an embodiment of the present disclosure.
FIG. 7C shows a zoomed view of the area marked in FIG. 7A, according to an embodiment of the present disclosure.
FIG. 7D shows a zoomed view of the area marked in FIG. 7B, according to an embodiment of the present disclosure.

FIG. 7A shows a crystal efficiency map from a cylinder source generated using the Defrise method, according to an embodiment of the present disclosure. FIG. 7B shows a crystal efficiency map from a line source generated using the method 600, according to an embodiment of the present disclosure. FIGS. 7A and 7B show full crystal efficiency maps, wherein the PET scanner 100 can include, for example, 64 rings (rows in the crystal map) and 576 crystals per ring (columns in the crystal map). The results demonstrate that the proposed line source normalization results from the method 600 have similar overall patterns as with those obtained using a cylinder source.

FIG. 7C shows a zoomed view of the area marked in FIG. 7A, according to an embodiment of the present disclosure. FIG. 7D shows a zoomed view of the area marked in FIG. 7B, according to an embodiment of the present disclosure. The proposed line source normalization method 600 successfully captures small details 799 indicated by the arrows.

Figure 8:
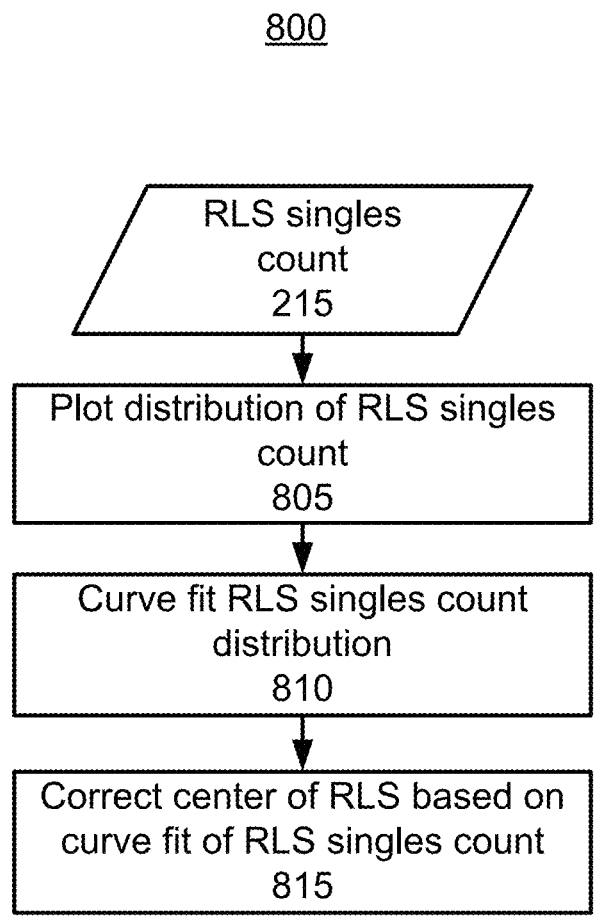
FIG. 8 shows a non-limiting example of a flow chart for a method of determining a corrected singles profile, according to an embodiment of the present disclosure.

For the previous methods, an assumption is made that the radiation source is centered, which may not always be practical. To overcome this challenge, a method of post-acquisition correction for an off-center source is described herein. FIG. 8 shows a non-limiting example of a flow chart for a method 800 of determining a corrected singles profile, according to an embodiment of the present disclosure. After the acquisition, from the RLS singles count 215, a center correction of the RLS 110 can be applied assuming all the crystals 105 are uniform and exactly the same with respect to the same acquisition. For a well-centered line source, all the acquisitions will be the same with the same singles count. If there is any off-center error, the crystals 105 closers to the RLS 110 will detect more counts of the singles 115. A correlation can be formed—if one crystal 105 detects more of the singles 115, another of the crystals 105 will concomitantly detect fewer of the singles 115. In an embodiment, a distribution of the RLS singles count 215 can be plotted assuming all the crystals 105 are the same, and any differences observed can be attributed to the RLS 110 positioning (step 805). The distribution can be fitted, for example, to a sinusoidal curve (step 810). To determine the extent of the center error, one can extract low frequency change from the RLS singles count 215 distribution. The low frequency change due to the center error can be fit to the sinusoidal curve, for example, like a low-pass filter. The original RLS singles count 215 distribution can be corrected, for example, by dividing the original RLS singles count 215 distribution curve with the sinusoidal curve to obtain an almost uniform corrected distribution curve, which can be used for all three methods (step 815). This can be assumed to be the actual, corrected RLS singles count 215.

Figure 9A:
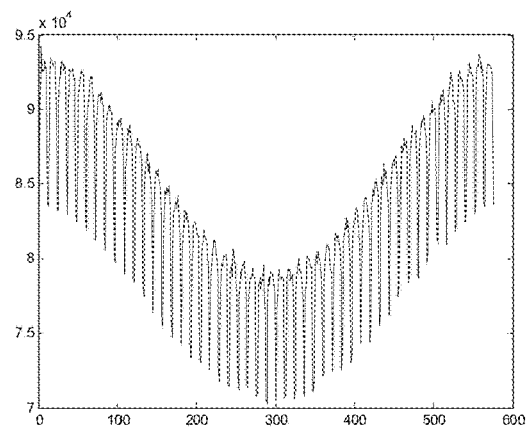
FIG. 9A shows a distribution of a RLS singles count with an off-center source, according to an embodiment of the present disclosure.

FIG. 9A shows a distribution of the RLS singles count 215 with an off-center source, according to an embodiment of the present disclosure. The distribution, as shown, can have a non-flat shape due to the off-center RLS 110.

Figure 9B:
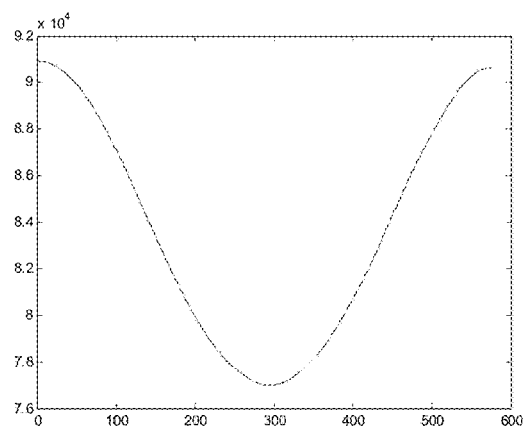
FIG. 9B shows a curve fit of a RLS singles count distribution, according to an embodiment of the present disclosure.

FIG. 9B shows a curve fit of the RLS singles count 215 distribution, according to an embodiment of the present disclosure. The curve can be, for example, sinusoidal in shape.

Figure 9C:
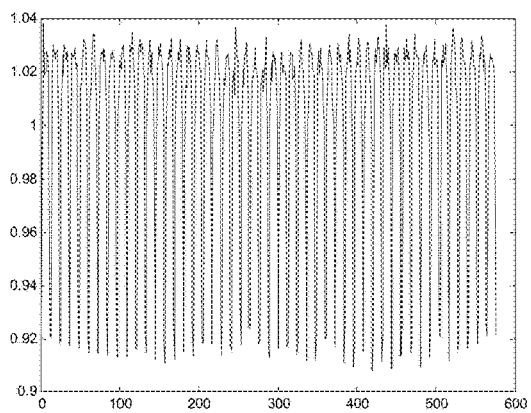
FIG. 9C shows a distribution of a corrected RLS singles count distribution, according to an embodiment of the present disclosure.

FIG. 9C shows a distribution of the corrected RLS singles count 215 distribution, according to an embodiment of the present disclosure. The original RLS singles count 215 distribution can be divided by the sinusoidal curve to obtain an almost uniform corrected distribution curve of the RLS singles count 215.

Figure 10A:
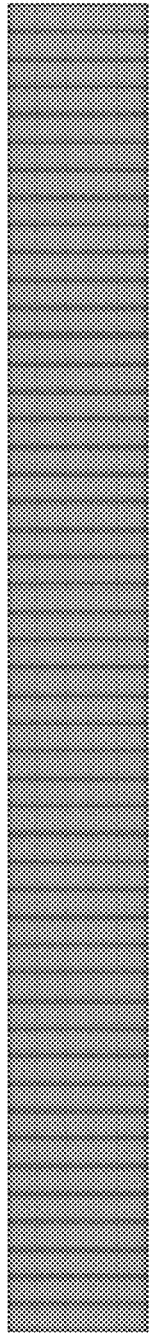
FIG. 10A shows a simulated crystal efficiency map of cylinder line source centered in a simulated PET scanner, according to an embodiment of the present disclosure.

FIG. 10A shows a simulated crystal efficiency map of cylinder line source centered in the simulated PET scanner, according to an embodiment of the present disclosure.

Figure 10B:
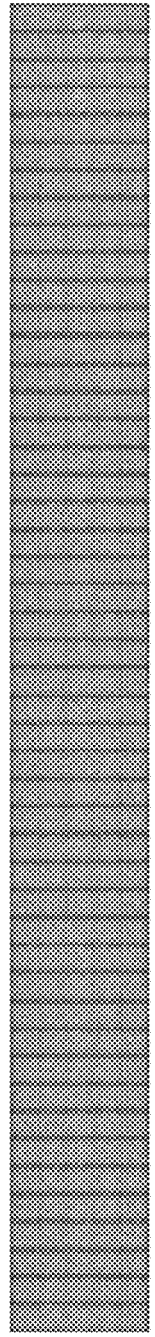
FIG. 10B shows a simulated crystal efficiency map of a RLS centered in a real PET scanner, according to an embodiment of the present disclosure.

FIG. 10B shows a simulated crystal efficiency map of the RLS 110 centered in the PET scanner 100, according to an embodiment of the present disclosure.

Figure 10C:
FIG. 10C shows a simulated crystal efficiency map of a RLS off-center in a real PET scanner, according to an embodiment of the present disclosure.

FIG. 10C shows a simulated crystal efficiency map of the RLS 110 off-center in the PET scanner 100, according to an embodiment of the present disclosure. For example, the RLS 110 can be off-center by 2 mm.

Figure 10D:
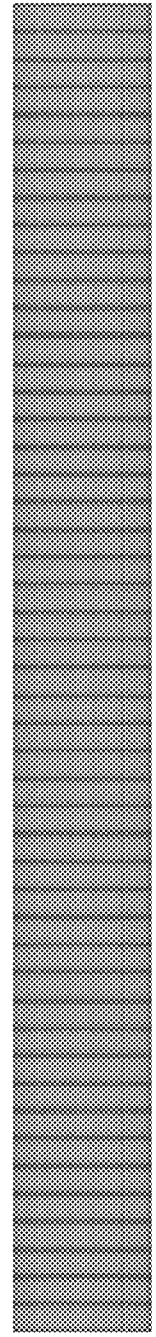
FIG. 10D shows a simulated crystal efficiency map of a RLS with off-center correction using a method described herein, according to an embodiment of the present disclosure.

FIG. 10D shows a simulated crystal efficiency map of the RLS 110 with off-center correction using the method 800, according to an embodiment of the present disclosure. Notably, the corrected map closely matches that of FIG. 10B.

Figure 11A:
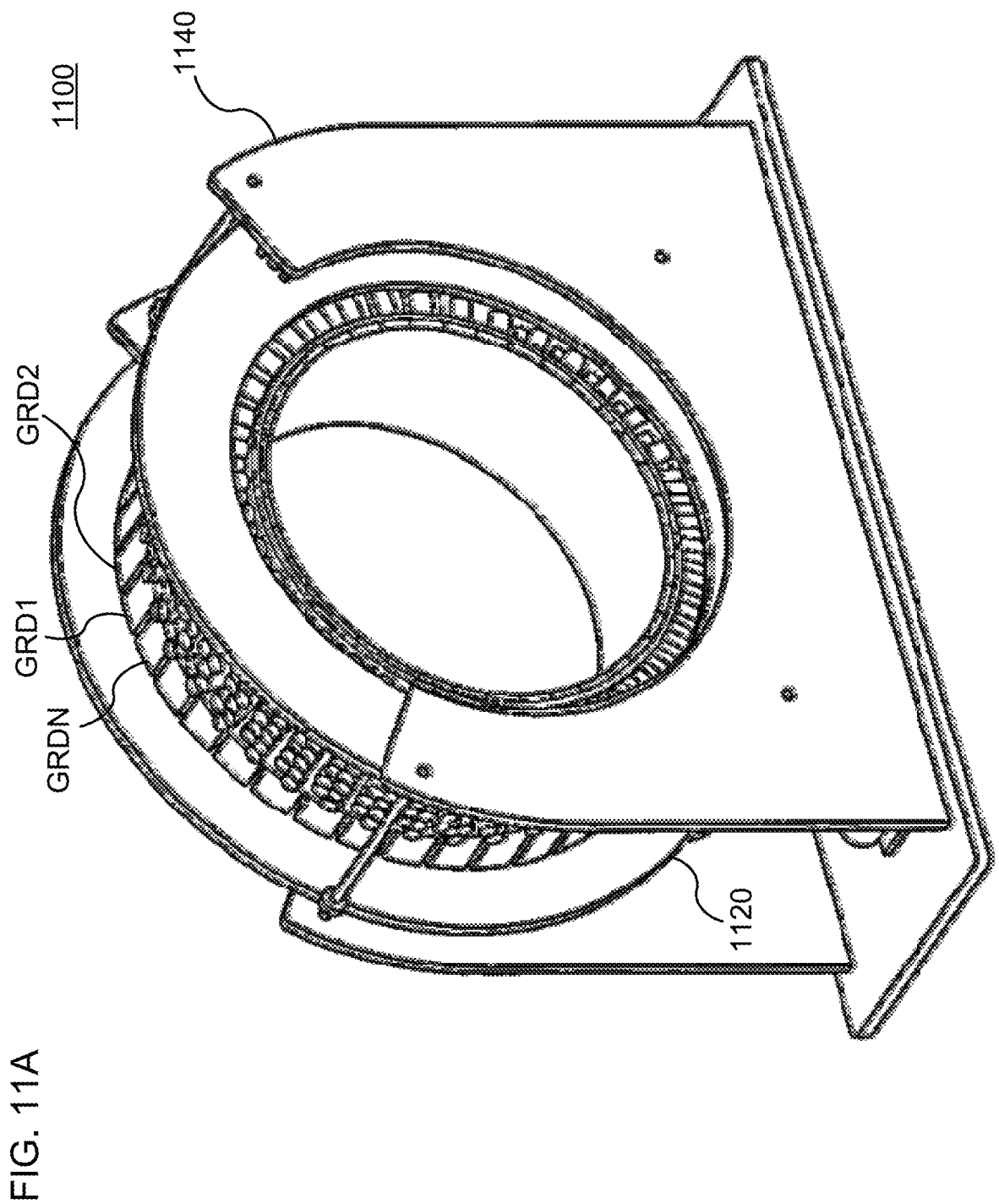
FIG. 11A shows a perspective view of a positron-emission tomography (PET) scanner, according to an embodiment of the present disclosure.
Figure 11B:
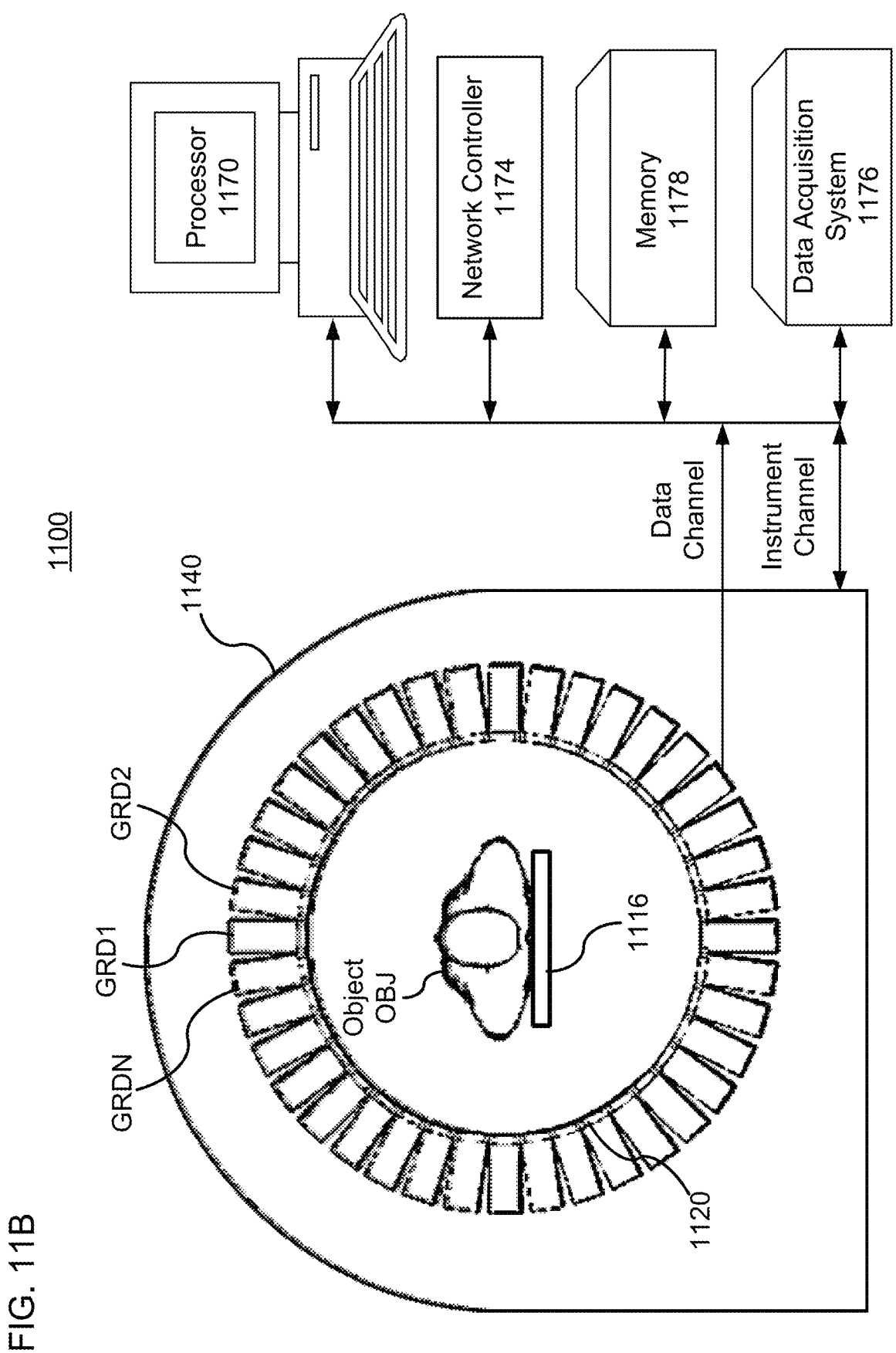
FIG. 11B shows a schematic view of a PET scanner, according to an embodiment of the present disclosure.

FIGS. 11A and 11B show a non-limiting example of a PET scanner 1100 that can implement the methods 100 and 200. The PET scanner 1100 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 1100.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 11B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 11A and 11B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 11B shows an example of the arrangement of the PET scanner 1100, in which the object OBJ to be imaged rests on a table 1116 and the GRD modules GRD1 through GRDN are arranged circumferentially around the object OBJ and the table 1116. The GRDs can be fixedly connected to a circular component 1120 that is fixedly connected to the gantry 1140. The gantry 1140 houses many parts of the PET imager. The gantry 1140 of the PET imager also includes an open aperture through which the object OBJ and the table 1116 can pass, and gamma-rays emitted in opposite directions from the object OBJ due to an annihilation event can be detected by the GRDs and timing and energy information can be used to determine coincidences for gamma-ray pairs.

In FIG. 11B, circuitry and hardware is also shown for acquiring, storing, processing, and distributing gamma-ray detection data. The circuitry and hardware include: a processor 1170, a network controller 1174, a memory 1178, and a data acquisition system (DAS) 1176. The PET imager also includes a data channel that routes detection measurement results from the GRDs to the DAS 1176, the processor 1170, the memory 1178, and the network controller 1174. The DAS 1176 can control the acquisition, digitization, and routing of the detection data from the detectors. In one implementation, the DAS 1176 controls the movement of the bed 1116. The processor 1170 performs functions including reconstructing images from the detection data, pre-reconstruction processing of the detection data, and post-reconstruction processing of the image data, as discussed herein.

The processor 1170 can be configured to perform various steps of methods 100 and/or 200 described herein and variations thereof. The processor 1170 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 1170 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 1178 can be a hard disk drive, CD-ROM drive, DVD drive, FLASH drive, RAM, ROM or any other electronic storage known in the art.

The network controller 1174, such as an Intel Ethernet PRO network interface card from Intel Corporation of America, can interface between the various parts of the PET imager. Additionally, the network controller 1174 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 11G and 4G wireless cellular systems. The wireless network can also be WiFi, Bluetooth, or any other wireless form of communication that is known.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) An imaging system, comprising: processing circuitry configured to obtain a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, determine, for each real detector in one ring of the rings of the real detectors, a relative transaxial efficiency based on the real singles count for the each real detector in the one ring of the rings of the real detectors, pair the single gamma rays emitted from the real line source traveling in opposite directions to obtain pairs of the single gamma rays, obtain a real pairs count of the pairs of the single gamma rays emitted from the real line source and detected by i) a first real detector of the real detectors along a first line of the real detectors disposed at the same position in each ring of the rings of the real detectors, and ii) all real detectors along a second line of the real detectors, the second line of real detectors disposed at the position opposite the first real detector in the ring, wherein the first real detector of the real detectors along the first line detects a first of the single gamma rays in the detected pair, and one of real detectors in the second line of the real detectors detects a second of the single gamma rays in the detected pair, determine, for each real detector in the first line of the real detectors, a relative axial efficiency based on the real pairs count, and determine, for each real detector of the real detectors, a real line source detector efficiency based on the relative axial efficiency and the relative transaxial efficiency.

(2) The system of (1), wherein the processing circuitry is further configured to obtain a simulated cylinder (SC) singles count of SC single gamma rays emitted from a SC source disposed in the center of rings of simulated detectors, each ring of the rings of the simulated detectors arranged adjacent to each other and extending along an axial direction of the rings of the simulated detectors, the SC single gamma rays being detected by the simulated detectors, pair the SC single gamma rays emitted from the SC source traveling in opposite directions to obtain SC pairs of the SC single gamma rays, obtain a SC pairs count of the SC pairs of the SC single gamma rays emitted from the SC source and detected by i) a first simulated detector of the simulated detectors along a first line of the simulated detectors disposed at the same position in each ring of the rings of the simulated detectors, and ii) all simulated detectors along a second line of the simulated detectors, the second line of the simulated detectors disposed at the position opposite the first simulated detector in the ring, wherein the first simulated detector of the simulated detectors along the first line detects a first of the SC single gamma rays in the detected SC pair, and one of simulated detectors in the second line of the simulated detectors detects a second of the SC single gamma rays in the detected SC pair, determine, for each simulated detector of the simulated detectors, a SC source detector efficiency based on the SC singles count and the SC pairs count, and obtain a simulated line (SL) singles count of SL single gamma rays emitted from a SL source disposed in the center of the rings of the simulated detectors.

(3) The system of (2), wherein the processing circuitry is further configured to determine, for each real detector of the real detectors, a first combined detector efficiency based on the real singles count, the SL singles count, and the SC source detector efficiency.

(4) The system of either (2) or (3), wherein the processing circuitry is further configured to determine, for each simulated detector in one ring of the rings of the simulated detectors, a relative simulated transaxial efficiency based on the SL singles count for the each simulated detector in the one ring of the rings of the simulated detectors, pair the SL single gamma rays emitted from the SL source traveling in opposite directions to obtain SL pairs of the SL single gamma rays, obtain a SL pairs count of the SL pairs of the SL single gamma rays emitted from the SL source and detected by i) the first simulated detector of the simulated detectors along the first line of the simulated detectors disposed at the same position in each ring of the rings of the simulated detectors, and ii) all the simulated detectors along the second line of the simulated detectors, the second line of the simulated detectors disposed at the position opposite the first simulated detector in the ring, wherein the first simulated detector of the simulated detectors along the first line detects a first of the SL single gamma rays in the detected SL pair, and the one of simulated detectors in the second line of the simulated detectors detects a second of the SL single gamma rays in the detected SL pair, determine, for the each simulated detector in the first line of the simulated detectors, a relative simulated axial efficiency based on the SL pairs count, and determine, for the each simulated detector of the simulated detectors, a SL source detector efficiency based on the relative simulated axial efficiency and the relative simulated transaxial efficiency.

(5) The system of either (2) or (4), wherein the processing circuitry is further configured to determine, for each real detector of the real detectors, a second combined detector efficiency based on the real line source detector efficiency, the SC source detector efficiency, and the SL source detector efficiency.

(6) The system of any one of (1) to (5), wherein the processing circuitry is further configured to determine a raw distribution of the real singles count of the single gamma rays detected by the real detectors, fit a curve to the raw distribution of the real singles count, and normalize the raw distribution of the real singles count based on the curve fit to the raw distribution to generate a corrected distribution of the real singles count.

(7) The system of any one of (2) to (6), wherein the processing circuitry is further configured to determine a raw distribution of the SC singles count of the SC single gamma rays detected by the simulated detectors, fit a curve to the raw distribution of the SC singles count, and normalize the raw distribution of the SC singles count based on the curve fit to the raw distribution to generate a corrected distribution of the SC singles count.

(8) The system of any one of (2) to (7), wherein the processing circuitry is further configured to determine a raw distribution of the SL singles count of the SL single gamma rays detected by the simulated detectors, fit a curve to the raw distribution of the SL singles count, and normalize the raw distribution of the SL singles count based on the curve fit to the raw distribution to generate a corrected distribution of the SL singles count.

(9) The system of (5), wherein the processing circuitry is further configured to reconstruct an image based on a dataset that has been normalized using the second combined detector efficiency.

(10) A method of normalizing detector elements in an imaging system, comprising obtaining a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, determining, for each real detector in one ring of the rings of the real detectors, a relative transaxial efficiency based on the real singles count for the each real detector in the one ring of the rings of the real detectors, pairing the single gamma rays emitted from the real line source traveling in opposite directions to obtain pairs of the single gamma rays, obtaining a real pairs count of the pairs of the single gamma rays emitted from the real line source and detected by i) a first real detector of the real detectors along a first line of the real detectors disposed at the same position in each ring of the rings of the real detectors, and ii) all real detectors along a second line of the real detectors, the second line of real detectors disposed at the position opposite the first real detector in the ring, wherein the first real detector of the real detectors along the first line detects a first of the single gamma rays in the detected pair, and one of real detectors in the second line of the real detectors detects a second of the single gamma rays in the detected pair, determining, for each real detector in the first line of the real detectors, a relative axial efficiency based on the real pairs count, and determining, for each real detector of the real detectors, a real line source detector efficiency based on the relative axial efficiency and the relative transaxial efficiency.

(11) The method of (10), further comprising obtaining a simulated cylinder (SC) singles count of SC single gamma rays emitted from a SC source disposed in the center of rings of simulated detectors, each ring of the rings of the simulated detectors arranged adjacent to each other and extending along an axial direction of the rings of the simulated detectors, the SC single gamma rays being detected by the simulated detectors, pairing the SC single gamma rays emitted from the SC source traveling in opposite directions to obtain SC pairs of the SC single gamma rays, obtaining a SC pairs count of the SC pairs of the SC single gamma rays emitted from the SC source and detected by i) a first simulated detector of the simulated detectors along a first line of the simulated detectors disposed at the same position in each ring of the rings of the simulated detectors, and ii) all simulated detectors along a second line of the simulated detectors, the second line of the simulated detectors disposed at the position opposite the first simulated detector in the ring, wherein the first simulated detector of the simulated detectors along the first line detects a first of the SC single gamma rays in the detected SC pair, and one of simulated detectors in the second line of the simulated detectors detects a second of the SC single gamma rays in the detected SC pair, determining, for each simulated detector of the simulated detectors, a SC source detector efficiency based on the SC singles count and the SC pairs count, and obtaining a simulated line (SL) singles count of SL single gamma rays emitted from a SL source disposed in the center of the rings of the simulated detectors.

(12) The method of (11), further comprising determining, for each real detector of the real detectors, a first combined detector efficiency based on the real singles count, the SL singles count, and the SC source detector efficiency.

(13) The method of either (11) or (12), further comprising determining, for each simulated detector in one ring of the rings of the simulated detectors, a relative simulated transaxial efficiency based on the SL singles count for the each simulated detector in the one ring of the rings of the simulated detectors, pairing the SL single gamma rays emitted from the SL source traveling in opposite directions to obtain SL pairs of the SL single gamma rays, obtaining a SL pairs count of the SL pairs of the SL single gamma rays emitted from the SL source and detected by i) the first simulated detector of the simulated detectors along the first line of the simulated detectors disposed at the same position in each ring of the rings of the simulated detectors, and ii) all the simulated detectors along the second line of the simulated detectors, the second line of the simulated detectors disposed at the position opposite the first simulated detector in the ring, wherein the first simulated detector of the simulated detectors along the first line detects a first of the SL single gamma rays in the detected SL pair, and the one of simulated detectors in the second line of the simulated detectors detects a second of the SL single gamma rays in the detected SL pair, determining, for the each simulated detector in the first line of the simulated detectors, a relative simulated axial efficiency based on the SL pairs count, and determining, for the each simulated detector of the simulated detectors, a SL source detector efficiency based on the relative simulated axial efficiency and the relative simulated transaxial efficiency.

(14) The method of either (11) or (13), further comprising determining, for each real detector of the real detectors, a second combined detector efficiency based on the real line source detector efficiency, the SC source detector efficiency, and the SL source detector efficiency.

(15) The method of any one of (10) to (14), further comprising determining a raw distribution of the real singles count of the single gamma rays detected by the real detectors, fitting a curve to the raw distribution of the real singles count, and normalizing the raw distribution of the real singles count based on the curve fit to the raw distribution to generate a corrected distribution of the real singles count.

(16) The method of any one of (11) to (15), further comprising determining a raw distribution of the SC singles count of the SC single gamma rays detected by the simulated detectors, fitting a curve to the raw distribution of the SC singles count, and normalizing the raw distribution of the SC singles count based on the curve fit to the raw distribution to generate a corrected distribution of the SC singles count.

(17) The method of any one of (11) to (16), further comprising determining a raw distribution of the SL singles count of the SL single gamma rays detected by the simulated detectors, fitting a curve to the raw distribution of the SL singles count, and normalizing the raw distribution of the SL singles count based on the curve fit to the raw distribution to generate a corrected distribution of the SL singles count.

(18) The method of (14), further comprising reconstructing an image based on a dataset that has been normalized using the second combined detector efficiency.

(19) A non-transitory computer-readable storage medium including executable instructions, which when executed by circuitry, cause the circuitry to perform a method of normalizing detector elements in an imaging system, comprising obtaining a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, determining, for each real detector in one ring of the rings of the real detectors, a relative transaxial efficiency based on the real singles count for the each real detector in the one ring of the rings of the real detectors, pairing the single gamma rays emitted from the real line source traveling in opposite directions to obtain pairs of the single gamma rays, obtaining a real pairs count of the pairs of the single gamma rays emitted from the real line source and detected by i) a first real detector of the real detectors along a first line of the real detectors disposed at the same position in each ring of the rings of the real detectors, and ii) all real detectors along a second line of the real detectors, the second line of real detectors disposed at the position opposite the first real detector in the ring, wherein the first real detector of the real detectors along the first line detects a first of the single gamma rays in the detected pair, and one of real detectors in the second line of the real detectors detects a second of the single gamma rays in the detected pair, determining, for each real detector in the first line of the real detectors, a relative axial efficiency based on the real pairs count, and determining, for each real detector of the real detectors, a real line source detector efficiency based on the relative axial efficiency and the relative transaxial efficiency.

(20) The computer-readable storage medium of (19), wherein the method further comprises obtaining a simulated cylinder (SC) singles count of SC single gamma rays emitted from a SC source disposed in the center of rings of simulated detectors, each ring of the rings of the simulated detectors arranged adjacent to each other and extending along an axial direction of the rings of the simulated detectors, the SC single gamma rays being detected by the simulated detectors, pairing the SC single gamma rays emitted from the SC source traveling in opposite directions to obtain SC pairs of the SC single gamma rays, obtaining a SC pairs count of the SC pairs of the SC single gamma rays emitted from the SC source and detected by i) a first simulated detector of the simulated detectors along a first line of the simulated detectors disposed at the same position in each ring of the rings of the simulated detectors, and ii) all simulated detectors along a second line of the simulated detectors, the second line of the simulated detectors disposed at the position opposite the first simulated detector in the ring, wherein the first simulated detector of the simulated detectors along the first line detects a first of the SC single gamma rays in the detected SC pair, and one of simulated detectors in the second line of the simulated detectors detects a second of the SC single gamma rays in the detected SC pair, determining, for each simulated detector of the simulated detectors, a SC source detector efficiency based on the SC singles count and the SC pairs count, obtaining a simulated line (SL) singles count of SL single gamma rays emitted from a SL source disposed in the center of the rings of the simulated detectors, determining, for each simulated detector in one ring of the rings of the simulated detectors, a relative simulated transaxial efficiency based on the SL singles count for the each simulated detector in the one ring of the rings of the simulated detectors, pairing the SL single gamma rays emitted from the SL source traveling in opposite directions to obtain SL pairs of the SL single gamma rays, obtaining a SL pairs count of the SL pairs of the SL single gamma rays emitted from the SL source and detected by i) the first simulated detector of the simulated detectors along the first line of the simulated detectors disposed at the same position in each ring of the rings of the simulated detectors, and ii) all the simulated detectors along the second line of the simulated detectors, the second line of the simulated detectors disposed at the position opposite the first simulated detector in the ring, wherein the first simulated detector of the simulated detectors along the first line detects a first of the SL single gamma rays in the detected SL pair, and the one of simulated detectors in the second line of the simulated detectors detects a second of the SL single gamma rays in the detected SL pair, determining, for the each simulated detector in the first line of the simulated detectors, a relative simulated axial efficiency based on the SL pairs count, determining, for the each simulated detector of the simulated detectors, a SL source detector efficiency based on the relative simulated axial efficiency and the relative simulated transaxial efficiency, and determining, for each real detector of the real detectors, a second combined detector efficiency based on the real line source detector efficiency, the SC source detector efficiency, and the SL source detector efficiency.

(21) An imaging system, comprising processing circuitry configured to obtain a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, obtain a simulated cylinder (SC) singles count of SC single gamma rays emitted from a SC source disposed in the center of rings of simulated detectors, each ring of the rings of the simulated detectors arranged adjacent to each other and extending along an axial direction of the rings of the simulated detectors, the SC single gamma rays being detected by the simulated detectors, pair the SC single gamma rays emitted from the SC source traveling in opposite directions to obtain SC pairs of the SC single gamma rays, obtain a SC pairs count of the SC pairs of the SC single gamma rays emitted from the SC source and detected by i) a first simulated detector of the simulated detectors along a first line of the simulated detectors disposed at the same position in each ring of the rings of the simulated detectors, and ii) all simulated detectors along a second line of the simulated detectors, the second line of the simulated detectors disposed at the position opposite the first simulated detector in the ring, wherein the first simulated detector of the simulated detectors along the first line detects a first of the SC single gamma rays in the detected SC pair, and one of simulated detectors in the second line of the simulated detectors detects a second of the SC single gamma rays in the detected SC pair, determine, for each simulated detector of the simulated detectors, a SC source detector efficiency based on the SC singles count and the SC pairs count, obtain a simulated line (SL) singles count of SL single gamma rays emitted from a SL source disposed in the center of the rings of the simulated detectors, and determine, for each real detector of the real detectors, a first combined detector efficiency based on the real singles count, the SL singles count, and the SC source detector efficiency.

(22) A method of normalizing detector elements in an imaging system, comprising obtaining a real singles count of single gamma rays emitted from a real line source disposed in the center of rings of real detectors, each ring of the rings of the real detectors arranged adjacent to each other and extending along an axial direction of the rings of the real detectors, the single gamma rays being detected by the real detectors, obtaining a simulated cylinder (SC) singles count of SC single gamma rays emitted from a SC source disposed in the center of rings of simulated detectors, each ring of the rings of the simulated detectors arranged adjacent to each other and extending along an axial direction of the rings of the simulated detectors, the SC single gamma rays being detected by the simulated detectors, pairing the SC single gamma rays emitted from the SC source traveling in opposite directions to obtain SC pairs of the SC single gamma rays, obtaining a SC pairs count of the SC pairs of the SC single gamma rays emitted from the SC source and detected by i) a first simulated detector of the simulated detectors along a first line of the simulated detectors disposed at the same position in each ring of the rings of the simulated detectors, and ii) all simulated detectors along a second line of the simulated detectors, the second line of the simulated detectors disposed at the position opposite the first simulated detector in the ring, wherein the first simulated detector of the simulated detectors along the first line detects a first of the SC single gamma rays in the detected SC pair, and one of simulated detectors in the second line of the simulated detectors detects a second of the SC single gamma rays in the detected SC pair, determining, for each simulated detector of the simulated detectors, a SC source detector efficiency based on the SC singles count and the SC pairs count, obtaining a simulated line (SL) singles count of SL single gamma rays emitted from a SL source disposed in the center of the rings of the simulated detectors, and determining, for each real detector of the real detectors, a first combined detector efficiency based on the real singles count, the SL singles count, and the SC source detector efficiency.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A positron emission tomography (PET) apparatus, comprising:
a PET detector comprising a plurality of arrayed rings in each of which a plurality of detector crystals are arrayed; and
processing circuitry configured to
acquire a first crystal efficiency for each detector crystal of the plurality of detector crystals based on a measured gamma ray emitted from a line source, a second crystal efficiency for said each detector crystal of the plurality of detector crystals, which is calculated based on a simulation assuming a gamma ray emitted from a cylinder source, and a third crystal efficiency for said each detector crystal of the plurality of detector crystals, which is calculated based on a simulation assuming a gamma ray emitted from a line source, and calculate a fourth crystal efficiency for said each detector crystal of the plurality of detector crystals based on the first crystal efficiency, the second crystal efficiency, and the third crystal efficiency.

2. The PET apparatus according to claim 1, wherein the processing circuitry is further configured to
count a number of single detection events detected at said each detector crystal of the plurality of detector crystals based on the measured gamma ray emitted from the line source,
determine a number of coincidence detection events for each arrayed ring, and
acquire the first crystal efficiency based on the number of the single detection events and the number of the coincidence detection events.

3. The PET apparatus according to claim 2, wherein the processing circuitry is further configured to
determine a relative transaxial efficiency of the detector crystal based on the number of the single detection events,
determine a relative axial efficiency of the detector crystal based on the number of the coincidence detection events, and
acquire the first crystal efficiency based on the relative axial efficiency and the relative transaxial efficiency.

4. The PET apparatus according to claim 1, wherein the processing circuitry is further configured to
acquire the second crystal efficiency based on the number of single detection events detected at said each detector crystal of the plurality of detector crystals and the number of coincidence detection events for each ring when a simulated gamma ray emitted from a simulated cylinder source is detected by a simulated PET detector, and
acquire the third crystal efficiency based on the number of single detection events detected at said each detector crystal of the plurality of detector crystals and the number of coincidence detection events for each ring when a simulated gamma ray emitted from a simulated line source is detected by the simulated PET detector.

5. The PET apparatus according to claim 4, wherein the processing circuitry is further configured to
determine a relative transaxial efficiency of the detector crystal based on the number of the single detection events based on the simulated gamma ray emitted from the simulated line source,
determine a relative axial efficiency of the detector crystal based on the number of the coincidence detection events based on the simulated gamma ray emitted from the simulated line source, and
acquire the third crystal efficiency based on the relative axial efficiency and the relative transaxial efficiency.

6. The PET apparatus according to claim 2, wherein the processing circuitry is further configured to correct the number of the single detection events by applying, to a distribution of the number of single detection events for said each arrayed ring based on the measured gamma ray emitted from the line source, a curve based on the distribution.

7. The PET apparatus according to claim 4, wherein the processing circuitry is further configured to correct the number of the single detection events based on the simulated cylinder source by applying, to a distribution of the number of single detection events for said each arrayed ring based on the simulated gamma ray emitted from the simulated cylinder source, a curve based on the distribution.

8. The PET apparatus according to claim 4, wherein the processing circuitry is further configured to correct the number of the single detection events based on the simulated line source by applying, to a distribution of the number of single detection events for said each arrayed ring based on the simulated gamma ray emitted from the simulated line source, a curve based on the distribution.

9. The PET apparatus according to claim 1, wherein the processing circuitry is further configured to reconstruct a PET image based on a dataset normalized by using the fourth crystal efficiency.

10. A method for determining the efficiency of detector crystals in a positron emission tomography (PET) apparatus, said method to be executed by the PET apparatus comprising a PET detector comprising a plurality of arrayed rings in each of which a plurality of detector crystals are arrayed, the method comprising:
acquiring a first crystal efficiency for each detector crystal based on a measured gamma ray emitted from a line source, a second crystal efficiency for each detector crystal, which is calculated based on a simulation assuming a gamma ray emitted from a cylinder source, and a third crystal efficiency for each detector crystal, which is calculated based on a simulation assuming a gamma ray emitted from a line source; and
calculating a fourth crystal efficiency for each detector crystal based on the first crystal efficiency, the second crystal efficiency, and the third crystal efficiency.

* * * * *